Nov. 18, 1969  D. J. CLARK ETAL  3,478,732
WIRE SAW DRUM
Filed March 15, 1967  2 Sheets-Sheet 2

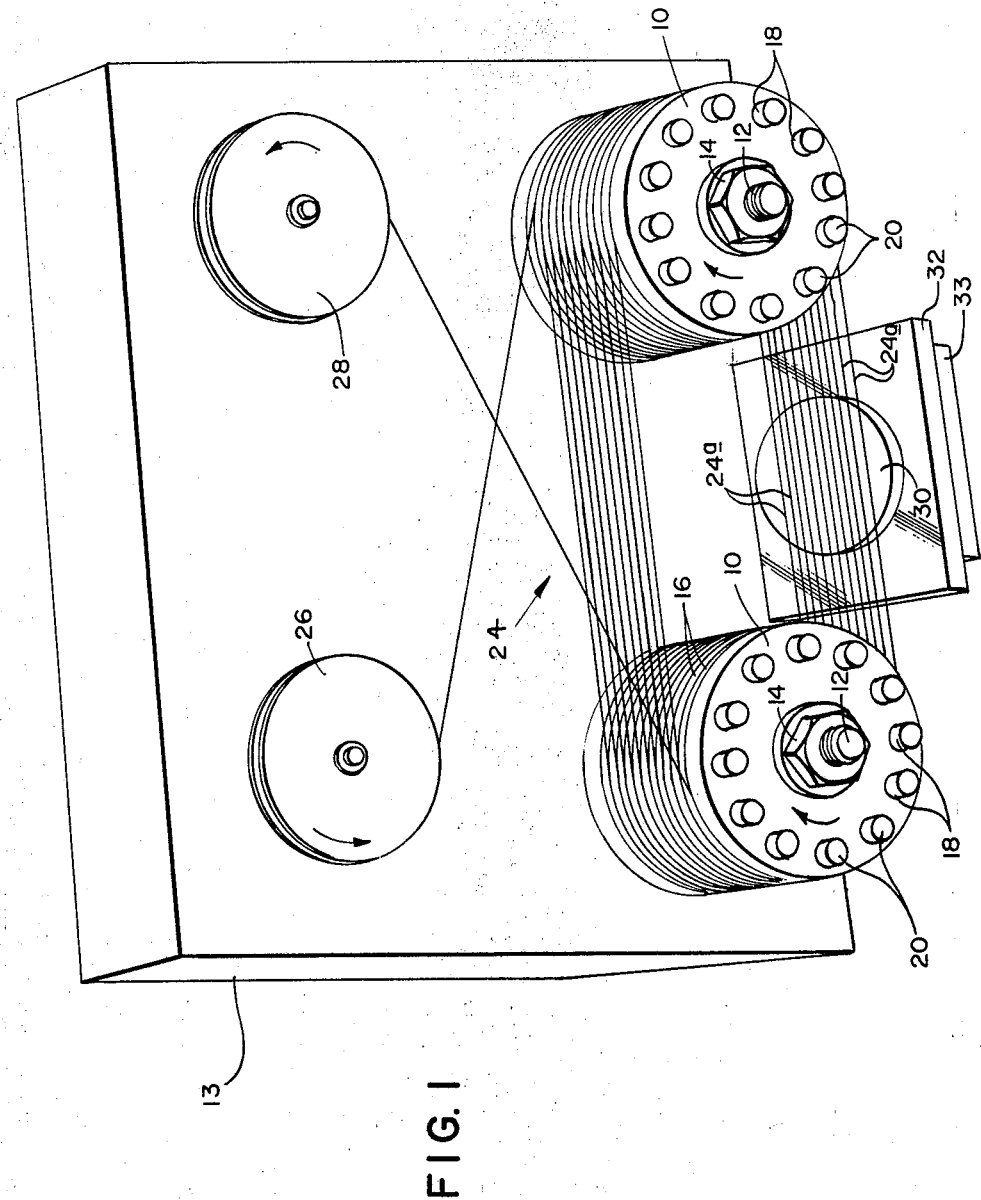

INVENTORS.
DAVID J. CLARK
WALTER T. BONIN
BY
Blair, Buckles & Cesari
ATTORNEYS

United States Patent Office 3,478,732
Patented Nov. 18, 1969

3,478,732
WIRE SAW DRUM
David J. Clark, Hudson, and Walter T. Bonin, Marlboro, Mass. (Both of 146 Main St., Maynard, Mass. 01754)
Filed Mar. 15, 1967, Ser. No. 623,297
Int. Cl. *B28d 1/08*
U.S. Cl. 125—12
14 Claims

ABSTRACT OF THE DISCLOSURE

A wear-resistant guide for a moving wire which comprises a circumferentially grooved drum for containing and quiding the moving wire. Wear-resistant rods extending through the drum intercept the groove so that the moving wire contained therein engages around the rods and does not bottom in the groove.

BACKGROUND OF THE INVENTION

Field of the invention

This invention relates to an improved wire saw. It relates more particularly to a wire saw guide drum which enables the saw to slice specimens quickly and accurately for relatively long periods and with a low maintenance cost.

Wire saws are well-known in the metallurgical art, where they are employed extensively to cut minerals quickly with minimum waste. In some such saws, several spaced, parallel wire lengths are operated in unison. This is done, for example, in semiconductor processing to slice rod-like crystals into thin, disc-like wafers; and also to dice these slices.

Description of the prior art

Generally, these prior multiple-cut wire saws consist of a pair of spaced rotatable drums each having a set of circumferential grooves spaced along its length. A long, thin wire, served from a suitable supply, is wound in helical fashion around the two drums, with the wire engaging around the drums being contained in the grooves and so that the wire strands spanning the drums are under tension. The free end of the wire is then threaded around a take-up reel. The drums and take-up reel are rotated in synchronism to advance the wire strands from one drum to the other, thus forming a set of spaced parallel saws.

The work is supported crosswise under these tensioned wire strands and biased toward them by any suitable means. In one typical system, the work is positioned on one end of a teeter, the other end of which is weighted. Also, an abrasive slurry is usually applied to the wires to enhance the cutting action. Eventually, the continued urging of the work toward the moving wire results in the wire's cutting through the work.

While wire saws should have a definite edge over their blade counterparts, their full potential has not yet been realized. This stems from the fact that for satisfactory cutting, the wires have to be stretched taut between the two grooved drums. This tends to cause the moving wire to wear the bottoms of the drum grooves. Furthermore, this wear is uneven over the drums. After slicing as few as fifteen to eighteen thin silicon wafers, the saw strands slacken by different amounts so that they cut irregularly and incompletely, and the drums have to be changed. In this connection, it should be borne in mind that the guide drums are small, precision-milled parts which are quite hard to make, and therefore quite costly. For this reason, prior saws are usually operated at minimum speed and with the wire maintained under the minimum amount of tension to produce adequate cutting. Thus, their efficiency is minimal and yet they still suffer from a considerable amount of down time.

Conventional saws have a further drawback in that the work being biased toward the wire strands under moderate pressure tends to bounce or oscillate against these strands. This sometimes causes the wire to snap, further decreasing the efficiency and productivity of the machine, while at the same time increasing its maintenance cost.

SUMMARY OF INVENTION

Accordingly, it is an object of this invention to provode a guide for a moving wire saw which is less prone to wear.

Another object of this invention is to provide a wire saw guide drum capable of operating continuously for relatively long periods.

A further object of this invention is to provide an improved wire saw capable of slicing through work relatively quickly and accurately.

A further object of this invention is to provide a wire saw having a relatively low maintenance cost.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the present wire saw comprises a pair of similar, spaced, rotatable drums. Each drum has a series of circumferential grooves spaced along its length. Passages extend longitudinally through the drum close to the edge thereof so that they intersect the aforesaid grooves. Rods of a suitably hard material received in these passages protrude appreciably into each drum groove. Rods 20 may be relatively loosely received in passage 18 so that they are free to rotate therein. Preferably, however, they have a snug fit.

The dimensional relationship between the grooves and rods is such that the wire contained in each drum groove actually seats on the rod portions therein and spans the groove bottom. Thus, as will be described in more detail later, the groove walls guide the wire turns only in the axial direction on the drums. The hard rods determine their radial position thereon and so bear the brunt of the forces due to the tensioned wire that formerly caused groove wear.

The work to be sliced is supported below the parallel tensioned wire strands spanning between the drums. Unlike prior practice, however, the work is not simply biased toward the wire. Rather, the moving wire is drawn down on the work so that the wire is under great tension and works its way through the object. By virtue of the aforesaid wear-resistant drums, the wire tension as well as wire speed can be made considerably greater than was possible with prior comparable saws. This, in turn, enables the present saw to cut faster and more efficiently, and yet for a longer period than saws using conventional guide drums.

As mentioned previously, the wire passing around the two drums engages the rod portions in the grooves and does not bottom in the grooves themselves. Thus, the wire follows noncircular paths around the drums. This causes the wire segments in the cutting area to vibrate at a fairly high frequency, further enhancing their ability to cut through the work. This feature will be described in more detail later.

The wire eventually wears even into the hard rods at the bottoms of the grooves. When this occurs, the efficiency of the saw deteriorates in the same fashion described above. However, this situation is remedied quickly simply by removing the worn rods and replacing them with new ones. This can be done at a tiny fraction of the cost of replacing the expensive drums themselves.

DESCRIPTION OF THE DRAWINGS

For a fuller understanding of the nature and objects of the invention, reference should be had to the following detailed description taken in connection with the accompanying drawings, in which:

FIG. 1 is a perspective view of a wire saw embodying the principles of this invention;

DESCRIPTION OF PREFERRED EMBODIMENT

Figure 3:
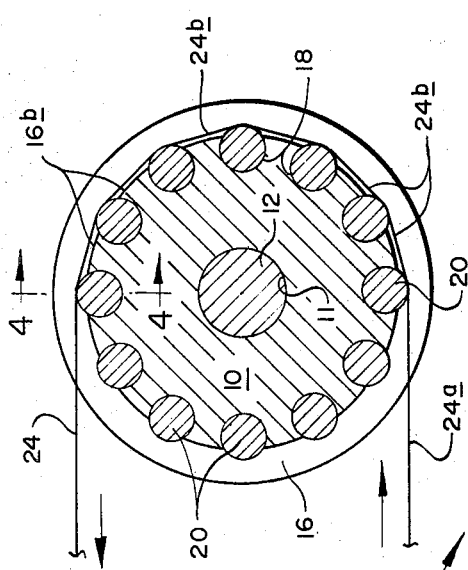
FIG. 3 is a view along line 3—3 of FIG. 2.

Our wire saw employs a pair of similar, spaced cylindrical drums 10. These are preferably made of brass or other suitable material. Each drum has a central axial passage 11 (FIG. 3) keyed to a threaded arbor 12 rotatable in a base 13. Drums 10 are secured for rotation with the arbors 12 by nuts 14 screwed onto the ends of the arbors.

Each drum 10 has a set of circumferential, relatively deep, V-shaped grooves 16 spaced along its length. In a typical embodiment of the invention, the drum 10 has seventy-nine such grooves.

Figure 4:
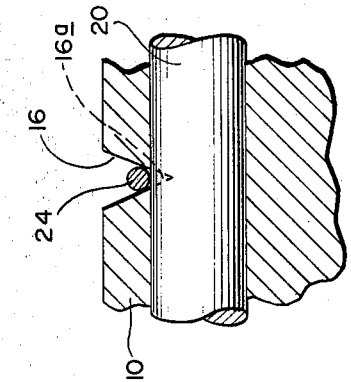
FIG. 4 is a view along line 4—4 of FIG. 3.

Also, a generally circular array of axial passages 18 are formed in each drum 10. Passages 18 are distributed angularly around the drum and are situated close to the perimeter thereof so that they all intersect grooves 16. A rod 20 is disposed in each passage 18. As best seen in FIGS. 3 and 4, rods 20 protrude appreciably into grooves 16 providing several spaced-apart, wear-resistant surfaces therein. While rods 20 may be composed of the same material as drums 10, they are preferably made of a strong and wear-resistant material such as hard steel.

A long, thin steel wire 24, served from a rotatable, free-running reel 26 (FIG. 1) is wound in helical fashion around the two drums 10, with the successive turns of wire on each drum being contained in axially successive drum grooves 16 and engaging rods 20 as will be described shortly. This forms a set of parallel, spaced wire strands 24a stretching between the bottoms of drums 10. The free end of wire 24 is then fed around a rotatable pick-up reel 28. In one embodiment of the invention, there are seventy-nine such strands 24a. However, it should be understood that there is no definite limit to the number of grooves 16 and strands 24a that can be used.

Arbors 12 are rotated together and in synchronism with take-up reel 28 by any suitable drive means (not shown). The drive system may also include provision for reversing the direction of rotation of drums 10 and also reversing the roles of reels 26 and 28, when reel 26 is nearly empty of wire.

Still referring to FIG. 1, the work being cut is illustrated here as a thin, disc-like wafer 30 which is positioned between drums 10 below strands 24a. Wafer 30 is adhered by wax or the like to a glass slide 32 which, in turn, is held in place by a conventional vacuum chuck 33 or other suitable means. Wafer 30 is positioned so that it lies completely above the points of departure of strands 24a from drums 10 (i.e. above the lowermost surfaces of the lowermost rods 20 in drums 10).

The wire strands 24a are placed under substantial initial tension. This is accomplished when installing the wire, e.g. by providing conventional means for altering the spacing between arbors 12 (and hence drums 10). The wire tension is sufficiently large as to create a vertical force component which pulls wire strands 24a tightly against wafer 30. Thus, when drums 10 are rotated, wire strands 24a work quickly down through wafer 30 under wire tension.

The chuck 33 may be positioned on one end of a teeter whose other end is weighted. This arrangement facilities loading and unloading the chuck. Then, if desired, the teeter may be locked in a position which causes wire strands 24a to push down against the wafer 30 sufficiently to cut it.

It should be mentioned at this point that as a practical mater, prior wire saws are not able to operate in this manner to advance the cutting wire through the work solely by wire tension. This is because when the wire is tensioned to the extent necessary to produce the requisite vertical force component to cut the work, a concomitant very much larger horizontal force component is created which causes the wire to wear quickly into the drums. In a very short time, excessive groove wear forces costly replacement of the drums. The present saw is, however, able to run the wire under greater tension and at greater speeds because the special construction of drums enables them to better withstand the abrading action of wire 24.

The wire strands 24a cut through wafer 30 uniformly and over the entire width of the wafer, forming uniform, parallel, thin strips. There is sufficient tension on the wire strands 24a to enable them to completely cut through the wafer 30. After this, the wafer 30 and slide 32 may be rotated 90° on chuck 33 and the same procedure followed to cut the strips into dice. These dice may then be processed further to make semiconductor devices or the like.

Figure 2:
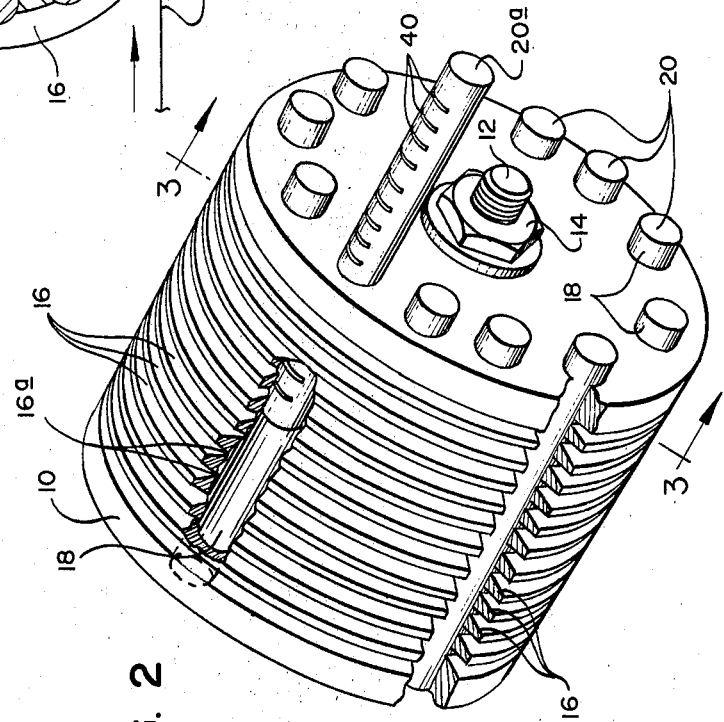
FIG. 2 is an enlarged perspective view, with parts cut away, of a portion of FIG. 1.

Referring now to FIG. 2, in the illustrated drum 10 there are twelve circular passages 18 distributed at equal angles around the drum (i.e. one every 30°). Passages 18 are also situated far enough out on radii of the drum to intersect the grooves 16. More specifically, they cut transversely through the bottom portion 16a of each V-shaped groove (FIGS. 2-4). The rods 20 fit in passages 18 and, when in place, they extend through groove portions 16a; typically, they project about a third of the way to the tops of the grooves 16.

It should be mentioned at this point that a set of slots may be used in lieu of passages 18. The slots would extend in from the periphery of the drums to the same depth as passages 18. Rods 20 would then be held in the slots either by a friction fit or by suitable spring clips.

Referring now to FIGS. 3 and 4, rods 20 are arrayed in the drums so that wire 24 contained in the drum grooves 16 engages around rods 20 rather than bottoming in the grooves. More specifically, the rods are positioned at points on the drum corresponding generally to the corners of a regular polygon that includes the circle corresponding to the bottom of a groove 16. The wire therefore proceeds in straight segments 24b from one rod 20 to the next, clearing the bottoms of the portions of grooves 16 situated between the rods. While the walls of grooves 16 control the positioning of the wire in the axial direction on the drums (i.e. the spacing between adjacent strands 24a), the forces exerted by the wire in these directions are minimal. It is the hard rods 20 controlling the positioning of the wire in the radial direction on the drums which oppose the large horizontal components of the tension forces described above. These are the force components which cause the rapid groove wear in prior wire saws. By directing these against the wear-resistant rods 20 instead of against the more vulnerable drum 10, the useful life of the drum is considerably prolonged. One such saw using our improved drums ran three to four times longer without maintenance than the same saw using conventional drums.

Ultimately, however, the wire 24 scores rods 20 forming the grooves 40 therein (FIG. 2). These grooves tend to alter the tensioning of the several strands 24a and cause nonuniform cutting as described above. This situation is quickly remedied at very small cost, however, by knocking out the worn rods 20 is depicted in FIG. 2 by the partially removed rod 20a, and either rotating them to present smooth surfaces to the wire or inserting new rods into the drums.

Referring again to FIG. 3, the inclusion of rods 20 as wear surfaces in drum 10 has the attendant advantage of directly improving the saw's cutting ability. More specifically, the fact that the wire 24 follows noncircular paths around drums 10 causes the wire strands 24a to vibrate up and down slightly with rotation of the drums enhancing the cutting action of the wire. The vibration rate depends primarily on the drum 10 diameter, the number of rods 20 and the speed of the drums, while the amplitude of vibration depends on the first two of these factors. We have found that a drum 10 having a diameter of two inches and containing twelve rods 20 and rotated at about 600 r.p.m. produces particularly satisfactory results. This example causes wire vibration whose rate is about 7200 c.p.m. or 120 c.p.s., in the low sonic range. The amplitude of vibration is small enough so that the wire strands 24a never leave the work, yet large enough to cause the wire to slice quickly through the work. In addition, the wire vibration encourages the abrasive slurry to work its way between the wire and the wafer, further enhancing the cutting efficiency of the saw.

It is apparent from the foregoing then that by virtue of our wire saw drum, we are able to cut quickly and uniformly through a variety of objects. Moreover, the saw can operate continuously for relatively long periods of time without maintenance. Further, even when wire wear eventually causes a drop in the quality of the cutting, the replacement of a few very inexpensive parts restores the saw to peak efficiency. All of these factors considerably increase the productivity and lower the maintenance cost of wire saws.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A guide for a moving wire comprising:
   (A) a drum (10);
   (B) means defining at least on groove (16) extending around the surface of said drum for containing and guiding a moving wire (24); and
   (C) rods (20) distributed angularly around said drum, each of said rods
      (1) extending into said drum; and
      (2) intersecting said groove so that the moving wire contained in said groove engages said rods and does not bottom in said groove.

2. A guide for a moving wire as defined in claim 1, wherein said rods
   (A) are cylindrical;
   (B) are arrayed on a radius of said drum, and
   (C) extend longitudinally through said drum.

3. A guide for a moving wire as defined in claim 2 wherein said rods are removable from said drum.

4. A guide for a moving wire as defined in claim 1 wherein said rods are removable from said drum.

5. A guide for a moving wire as defined in claim 4 wherein said drum is made of a relatively soft material and said rods are made of a wear-resistant material.

6. A guide for a moving wire as defined in claim 1 wherein said drum has a set of circumferential grooves (16) spaced longitudinally on said drum.

7. An improved guide for a wire saw comprising:
   (A) a rotatable drum (10);
   (B) a set of peripheral grooves (16) in said drum for containing a wire (24), said grooves being spaced longitudinally on said drum;
   (C) an array of passages (18) extending longitudinally through said drum, said passages
      (1) being distributed angularly around said drum on a radius thereof;
      (2) intersecting said grooves, and
   (D) a set of rods (20), said rods being
      (1) made of a wear-resistant material, and
      (2) adapted to slide into said passages so as to occupy portions of said grooves so that the wire contained in said grooves spans between said rods in substantially straight segments (24b).

8. An improved guide for a wire saw as defined in claim 7 and further including:
   (A) a rod (20) contained in each of said passages; and
   (B) turns of wire (24) contained in said grooves (16), said grooves positioning said wire in the longitudinal direction on said drum, said rods positioning said wire in the radial direction on said drum.

9. An improved guide for a wire saw as defined in claim 8 wherein:
   (A) the diameter of said drum is related to the number of said rods such that said wire turns of wire between said rods are spaced from the bottoms of said groove; and
   (B) further including means for rotating said drum whereby the wire (24a) leaving said drum vibrates as it feeds from successive ones of said rods.

10. An improved wire saw comprising:
    (A) a pair of spaced-apart rotatable cylindrical drums (10), each of said drums having
       (1) a set of longitudinally spaced circumferential grooves (16) therein;
       (2) an array of passages (18) distributed around said drum on a radius thereof, each of said passages
          (a) extending longitudinally through said drum; and
          (b) intersecting said grooves; and
       (3) rods (20) of wear-resistant material disposed in said passages so as to protrude into said grooves;
    (B) a thin wire (24) wound in helical fashion around said drums so that the wire passing around said drums.
       (1) is contained in said grooves;
       (2) engages over said rods; and
       (3) clears the bottom of said grooves between said rods; and
    (C) means (26, 28) for feeding wire to said drums and retrieving it therefrom.

11. An improved wire saw as defined in claim 10 wherein said rods are removable from said drums.

12. An improved wire saw as defined in claim 10 and further including means for rotating said drums and said retrieving means.

13. An improved wire saw as defined in claim 12 and further including means (33) for supporting work against tensioned segments (24a) of said wire between said drums whereby said wire segments slice through said work.

14. An improved wire saw as defined in claim 13 wherein the diameter of each said drum is related to the number of said rods therein such that said wire segments vibrate as they slice through said work.

References Cited
UNITED STATES PATENTS

| | | | |
|---|---|---|---|
| 995,269 | 6/1911 | Maurino | 125—21 |
| 1,802,759 | 4/1931 | Dunlop | 74—230.5 X |
| 3,155,087 | 11/1964 | Dreyfus | 125—21 |
| 3,220,149 | 11/1965 | Dioquardi | 125—21 X |

FOREIGN PATENTS

| | | |
|---|---|---|
| 18,569 | 10/1892 | Great Britain. |
| 75,868 | 3/1918 | Switzerland. |

HAROLD D. WHITEHEAD, Primary Examiner

U.S. Cl. X.R.

74—230.5; 125—21; 242—157

UNITED STATES PATENT OFFICE
CERTIFICATE OF CORRECTION

Patent No. 3,478,732                                November 18, 1969

David J. Clark et al.

It is certified that error appears in the above identified patent and that said Letters Patent are hereby corrected as shown below:

In the heading to the printed specification, line 4, "(Both of 146 Main St., Maynard, Mass. 01754)" should read -- , assignors to Digital Equipment Corporation, Maynard, Mass. --. Column 1, line 12, "quiding" should read -- guiding --. Column 2, line 18, "provode" should read -- provide --; line 42, "passage" should read -- passages --. Column 4, line 18, "mater" should read -- matter -- Column 5, line 9, "is" should read -- as --; line 61, "on" should read -- one --.

Signed and sealed this 5th day of January 1971.

(SEAL)
Attest:

Edward M. Fletcher, Jr.                    WILLIAM E. SCHUYLER, JR.
Attesting Officer                              Commissioner of Patents